United States Patent
Maeda et al.

(10) Patent No.: US 7,107,850 B2
(45) Date of Patent: Sep. 19, 2006

(54) BEARING VIBRATION MEASURING APPARATUS, BEARING VIBRATION MEASURING METHOD, AND RADIAL TYPE BEARING

(75) Inventors: Takashi Maeda, Kanagawa (JP); Kazumasa Nakajima, Kanagawa (JP); Takeo Kawamata, Kanagawa (JP)

(73) Assignee: NSK Ltd., Tokyo (JP)

( * ) Notice: Subject to any disclaimer, the term of this patent is extended or adjusted under 35 U.S.C. 154(b) by 243 days.

(21) Appl. No.: 10/845,124

(22) Filed: May 14, 2004

(65) Prior Publication Data

US 2005/0196090 A1   Sep. 8, 2005

(30) Foreign Application Priority Data

May 15, 2003  (JP) .......................... P.2003-137409
Apr. 13, 2004  (JP) .......................... P.2004-117830

(51) Int. Cl.
*G01H 1/08* (2006.01)
*G01M 13/04* (2006.01)
*F16C 33/58* (2006.01)

(52) U.S. Cl. .................... 73/593; 73/587; 73/660; 73/865.8; 384/513; 384/624

(58) Field of Classification Search ............. 73/593, 73/587, 660, 865.8; 384/624, 513; G01M 13/04
See application file for complete search history.

(56) References Cited

U.S. PATENT DOCUMENTS 5,889,218 A * 3/1999 Sato et al. .................. 73/865.8
6,293,151 B1 * 9/2001 Kawamata et al. ........... 73/593

FOREIGN PATENT DOCUMENTS

JP        2002-350289 A     12/2002
JP        2003149084 A *    5/2003

* cited by examiner

*Primary Examiner*—Daniel S. Larkin
*Assistant Examiner*—Samir M. Shah
(74) *Attorney, Agent, or Firm*—Sughrue Mion, PLLC

(57) ABSTRACT

A bearing vibration measuring apparatus is an apparatus of measuring vibration of a bearing. The bearing vibration measuring apparatus detects a vibration component generated from the bearing in a state of pressing one of an inner ring and an outer ring of the bearing in an axial direction while relatively rotating other of the inner ring and the outer ring to detect a defect of the bearing based on the vibration component. The bearing vibration measuring apparatus includes a driving mechanism elongated and contracted for inclining the inner ring or the outer ring.

3 Claims, 10 Drawing Sheets

FLAW NO. 2

WAVEFORM WHEN BEARING
HAS FLAW AT OUTER RING

BEARING VIBRATION MEASURING APPARATUS, BEARING VIBRATION MEASURING METHOD, AND RADIAL TYPE BEARING

BACKGROUND OF THE INVENTION

1. Field of the Invention

The prevent invention relates to a bearing vibration measuring apparatus and a bearing vibration measuring method for detecting a defect of a bearing based on vibration generated from the bearing and a radial type bearing vibration of which is measured by a bearing vibration measuring apparatus.

2. Description of the Related Art

There is known a bearing vibration measuring apparatus 70 shown in FIG. 12 as an example of a bearing vibration measuring apparatus of a related art (refer to, for example, JP-A-2002-350289 (pages 2 through 4, FIG. 1)).

In the bearing vibration measuring apparatus 70, a straight arbor 73 is fitted to an inner ring 72 of a bearing 71, and the straight arbor 73 is connected to a rotating main spindle of a motor 74. The motor 74 is supplied with an alternating current power from an inverter 75 and is rotated at a resolution number in accordance with a frequency of the alternating current power. A pickup 77 is arranged to be opposed to an outer circumferential face 76a of an outer ring 76 of the bearing 71 with a predetermined clearance therebetween, and the pickup 77 detects vibration generated from the outer ring 76. A vibrating signal detected by the pickup 77 is subjected to amplification and signal processing by an amplifier 78 and a waveform of the vibrating signal is recorded by a predetermined waveform recording apparatus.

Further, the bearing vibration measuring apparatus 70 is provided with a press rotating unit 79 for rotating the outer ring 76 of the bearing 71 while pressing the outer ring 76 in an axial direction. The press rotating unit 79 includes a pressing jig 80 for pressing an end face 76b in an axial direction of the outer ring 76; an inclined rotating shaft 81 connected to the pressing jig 80 and inclined to a center axis J0 of the straight arbor 73, and a self-rotating pulley 82 fixed to an end of the inclined rotating shaft 81. The inclined rotating shaft 81 is supported at substantially both ends thereof in the axial direction by bearings (not illustrated) on an inner circumferential side of an inner cylinder (not illustrated).

In the bearing vibration measuring apparatus 70, the motor 74 is rotated at a predetermined revolution number by supplying the alternating current power from the inverter 75 to the motor 74 to there by rotate the inner ring 72 of the bearing 81 integrally with the arbor 73. At the same time, the press rotating unit 79 rotates the pulley 82 and a pulley 85 by driving a motor 83 and a motor 84 while pressing the end face 76b of the outer ring 76 of the bearing 71 by the pressing jig 80. Thereby, while the pressing jig 80 is being self-rotated by constituting a rotating shaft by a self-rotating shaft J1, by a resolution number lower than that of the self-rotation, the inner cylinder axially supporting the shaft 81 is rotated. By rotating the inner cylinder on an inner side of an outer cylinder, a through hole of the inner cylinder is made to whirl relative to the rotating axis J0 of the arbor 73, and thus while the shaft 81 is being self-rotated on the self-rotating axis J1, the self-rotating axis J1 is made to whirl at a surrounding of the rotating axis J0 at a speed slower than the self-rotating speed and the shaft 81 carries out a precession movement to thereby subject the pressing jig 80 also to the precession movement. Thereby, there is detected a flaw or an inclusion present from vicinities of shoulders to vicinities of bottoms in track faces of the inner ring 72 and the outer ring 76 of the bearing 71.

However, in the above-described bearing vibration measuring apparatus 70, the press rotating unit 79 for making the pressing jig 80 carry out the precession movement is provided with a complicated structure and therefore, the apparatus is expensive. Further, the inclination of the outer ring 76 is uniquely determined by a shape of the pressing jig 80 and therefore, there is needed a pressing jig in correspondence with a desired inclination of the outer ring. Further, in detecting a flaw in applying a correct thrust load to the outer ring 76 or in detecting a shape component of the inner ring 72 or the outer ring 76 by vibration such as a waviness or the like, it is necessary to measure the flaw or the shape component by applying the correct thrust load to the outer ring 76. However, since the pressing jig 80 is provided with a shape of inclining the outer ring 76 and therefore, the correct thrust load cannot be applied thereto. Furthermore, only a single kind of a mode of inclining the outer ring 76 is provided by the shape of the pressing jig 80 and therefore, there is a high possibility in measurement by the bearing vibration measuring apparatus 70 that a bearing having a defect is determined to be an acceptable product.

SUMMARY OF THE INVENTION

The invention has been carried out in view of the above-described situation and it is an object thereof to provide a small-sized and inexpensive bearing vibration measuring apparatus and an inexpensive bearing vibration measuring method capable of measuring a flaw or an inclusion by providing an arbitrary inclination to an inner ring or an outer ring, capable of applying a correct thrust load to an inner ring or an outer ring and capable of expanding a vibration measuring region with regard to a track face of an inner ring or an outer ring without needing a complicated mechanism, and a radial type bearing vibration of which is measured by a bearing vibration measuring apparatus and which is not provided with a defect.

In order to achieve the above-described object, a bearing vibration measuring apparatus, according to the invention, for detecting a vibration component generated from a bearing, which includes an inner ring, an outer ring, and a plurality of rolling elements arranged between the inner ring and the outer ring rotatable in a circumferential direction, in a state of pressing one of the inner ring and the outer ring while relatively rotating other of the inner ring and the outer ring to measure a vibration of the bearing, and detecting a defect of the bearing based on the vibration component, comprises:

a driving mechanism for pressing the one of the inner ring and the outer ring in an axial direction, wherein the driving mechanism is elongated and contracted for inclining the one of the inner ring and the outer ring.

According to the bearing vibration measuring apparatus having the above-described constitution, by elongating and contracting the driving mechanism, vibration is measured while inclining the inner ring or the outer ring. Therefore, when the driving mechanism is operated in a state of rotating the inner ring and pressing the outer ring, the outer ring is inclined by elongating and contracting the driving mechanism. By inclining the outer ring, the rolling element arranged between the inner and the outer rings is rolled in a wider width region and therefore, the vibration measuring region can be expanded by the roller member rolling in the wide width region. Further, contrary thereto, when the driving mechanism is operated in a state of rotating the outer ring and pressing the inner ring, the inner ring is inclined by elongating and contracting the driving mechanism. By inclining the inner ring, the rolling element arranged between the inner and the outer rings is rolled on two track faces of the inner and the outer rings in a wider width region and therefore, the vibration measuring region can be expanded by the rolling element rolling in the wide width region. Further, by changing a method of controlling the elongated and contracted driving mechanism, an arbitrary inclination can be realized and therefore, the vibration measuring region having an arbitrary pattern can be set. Thereby, a complicated mechanism is not needed and therefore, the structure is simple, small-sized and inexpensive, measurement can be carried out by providing arbitrary inclinations to the inner ring and the outer ring and the vibration measuring region can be expanded with regard to track faces of the inner ring and the outer ring.

Further, in order to achieve the above-described object, a bearing vibration measuring method, according to the invention, for measuring vibration of a bearing including an inner ring, an outer ring, and a plurality of rolling elements arranged between the inner ring and the outer ring rotatable in a circumferential direction, comprises:

controlling to elongate and contract a driving mechanism capable of being elongated and contracted such that one of the inner ring and the outer ring is inclined in a state of pressing the one of the inner ring and the outer ring in an axial direction by the driving mechanism while relatively rotating other of the inner ring and the outer ring;

detecting a vibration component generated from the bearing; and detecting a defect of the bearing based on the vibration component.

According to the bearing vibration measuring method, by elongating and contracting the driving mechanism, vibration is measured while inclining the inner ring or the outer ring. Therefore, when the driving mechanism is operated in a state of rotating the inner ring and pressing the outer ring, the outer ring is inclined by elongating and contracting the driving mechanism. By inclining the outer ring, the rolling element arranged between the inner and the outer rings is rolled in a wider width region and therefore, the vibration measuring region can be expanded by the rolling element rolling in the wide width region. Further, contrary thereto, when the driving mechanism is operated in a state of rotating the outer ring and pressing the inner ring, the inner ring is inclined by elongating and contracting the driving mechanism. By inclining the inner ring, the rolling element arranged between the inner and the outer rings is rolled on two track faces of the inner and the outer rings in a wider width region and therefore, the vibration measuring region can be expanded by the rolling element rolling in the wide width region. Further, by changing a method of controlling the elongated and contracted driving mechanism, an arbitrary inclination can be realized and therefore, the vibration measuring region having an arbitrary pattern can be set. Thereby, a complicated mechanism is not needed and therefore, the apparatus is inexpensive, measurement can be carried out while providing arbitrary inclinations to the inner ring and the outer ring and the vibration measuring region can be expanded with regard to track faces of the inner ring and the outer ring.

Further, in order to achieve the above-described object, a radial type bearing according to the invention comprises:

an inner ring;
an outer ring; and
a plurality of rolling elements arranged between the inner ring and the outer ring rotatable in a circumferential direction, wherein the radial type bearing has a group of running traces of the rolling element, which is formed over an entire periphery of one of an outer circumferential face of the inner ring and an inner circumferential face of the outer ring on which the rolling element is run by a vibration measurement of the above-mentioned bearing vibration measuring apparatus of the invention, and contours of two sides of the group of running traces extended in the circumferential direction are waveforms remote from and proximate to each other such that a width in the axial direction of the group of running traces is increased and reduced in the circumferential direction.

According to the radial type bearing, the bearing is measured by the bearing vibration measuring apparatus of the invention and therefore, a group of running traces of the rolling element is formed over an entire periphery of one of the outer circumferential face of the inner ring and the inner circumferential face of the outer ring on which the rolling element is run. The contours of the two sides of the group of running traces extended in the circumferential direction become waveforms remote from and proximate to each other such that the width in the axial direction of the group of running traces is increased and reduced in the circumferential direction. Therefore, the radial type bearing having the contours on the two sides of the group of running traces of the rolling element is the radial type bearing according to the invention measured by the bearing vibration measuring apparatus of the invention and is selected as a radial type bearing which is not provided with a defect of a flaw or the like. By using the radial type bearing which is not provided with a defect of a flaw or the like in this way at rotating portions in various machines or apparatus, the rotating portions can highly accurately be supported.

According to the invention, there can be provided the small-sized and inexpensive bearing vibration measuring apparatus and the inexpensive bearing vibration measuring method capable of carrying out measurement while providing an arbitrary inclination to the inner ring or the outer ring, further, capable of applying the correct thrust load to the inner ring or the outer ring and capable of expanding the vibration measuring region with respect to the trace face of the inner ring or the outer ring without needing a complicated mechanism. There can be also provided the radial type bearing vibration is which is measured by the bearing vibration measuring apparatus and which is not provided with a defect. Therefore, there can be resolved problems of (A) being expensive by constituting a complicated structure, (B) needing a pressing jig in correspondence with a desired inclination of an outer ring, (C) incapable of applying the correct thrust load (D) having a high possibility of determining a bearing having a defect as an acceptable product as in the related art.

A concise explanation has been given of the invention as described above. Further, details of the invention will be made to be further clear by reading the best mode for embodying the invention explained below in reference to the drawings.

DETAILED DESCRIPTION OF THE INVENTION

A detailed explanation will be given of a plurality of preferable embodiments according to the invention in reference to the drawings as follows.

(First Embodiment)

Figure 1:
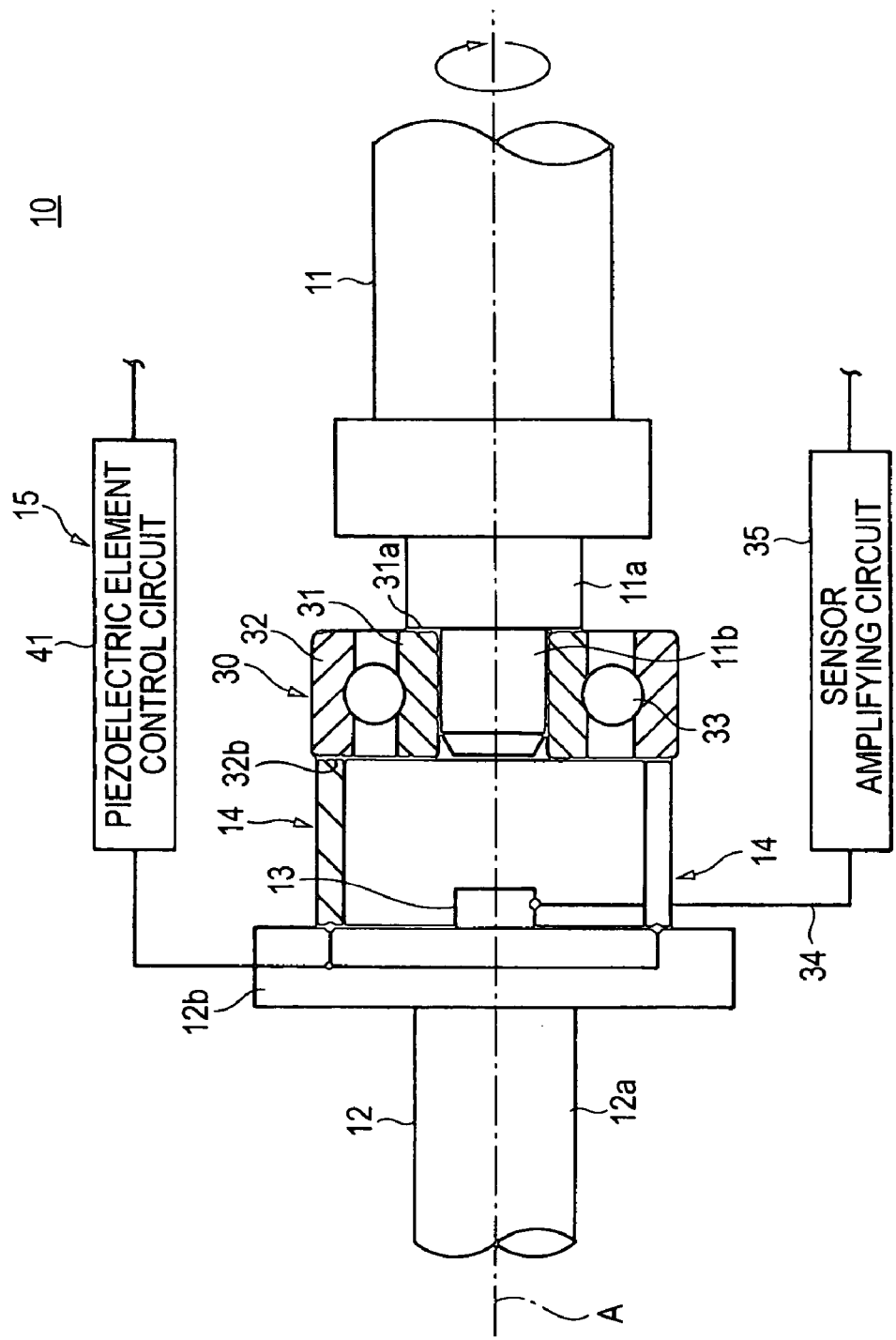
FIG. 1 is a schematic view showing a first embodiment of a bearing vibration measuring apparatus according to the invention.
Figure 2:
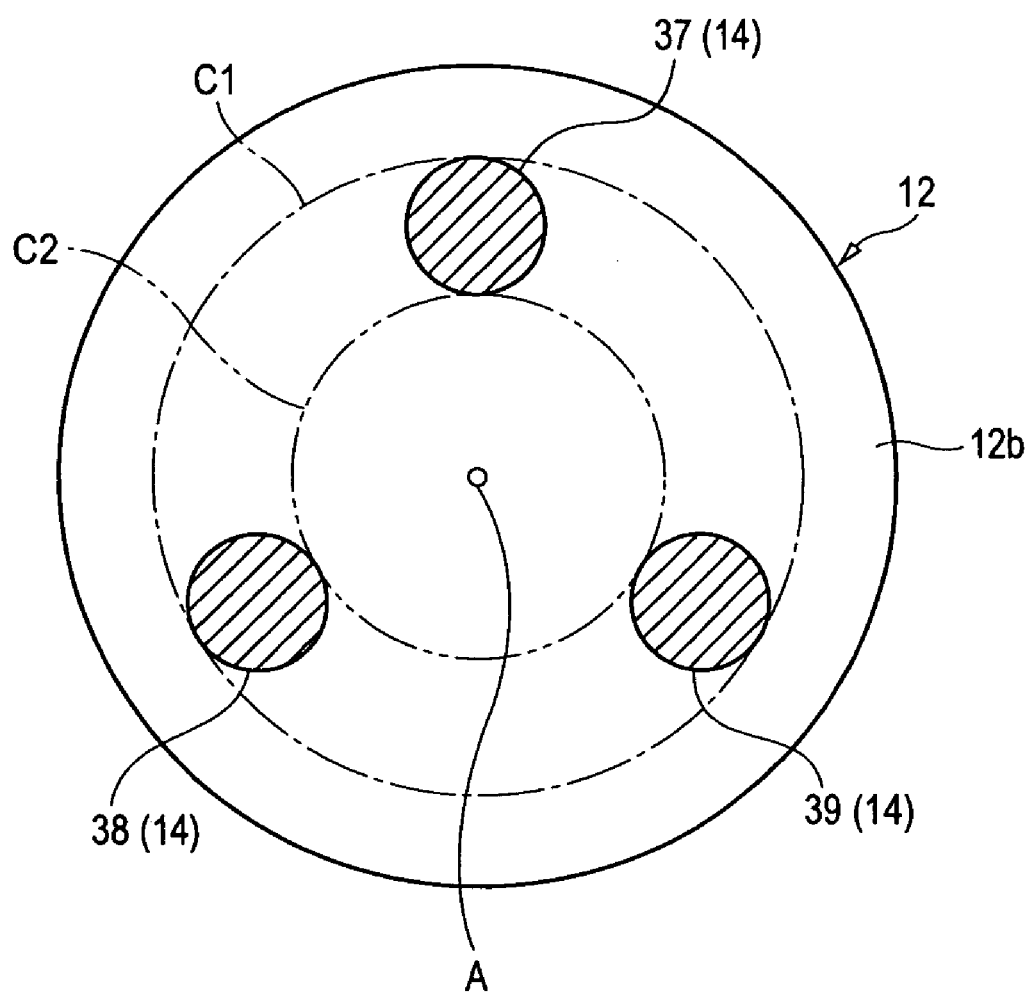
FIG. 2 is a view for explaining an arrangement of a piezoelectric element used as a driving mechanism of the bearing vibration measuring apparatus shown in FIG. 1.
Figure 3:
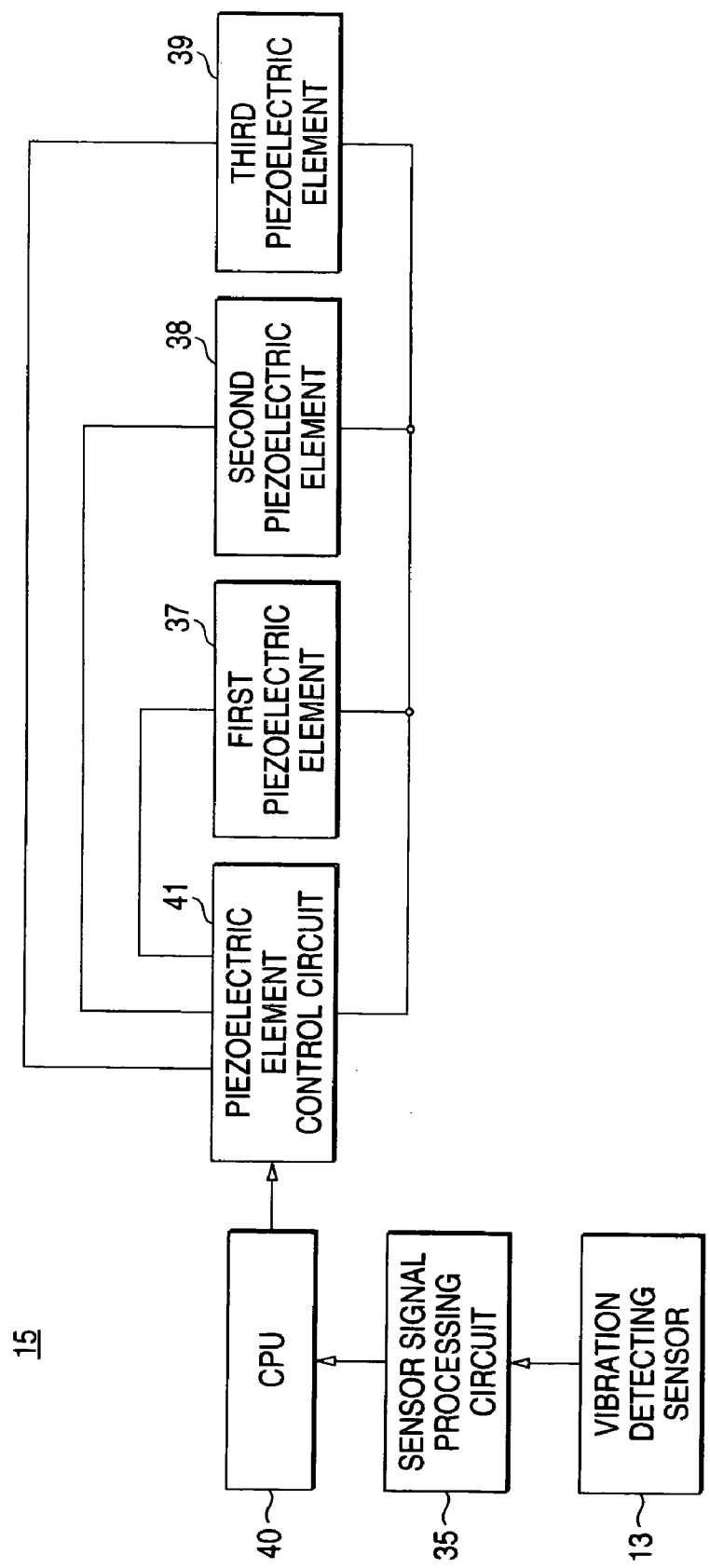
FIG. 3 in a block diagram of a control circuit used for the bearing vibration measuring apparatus shown in FIG. 1.
Figure 4:
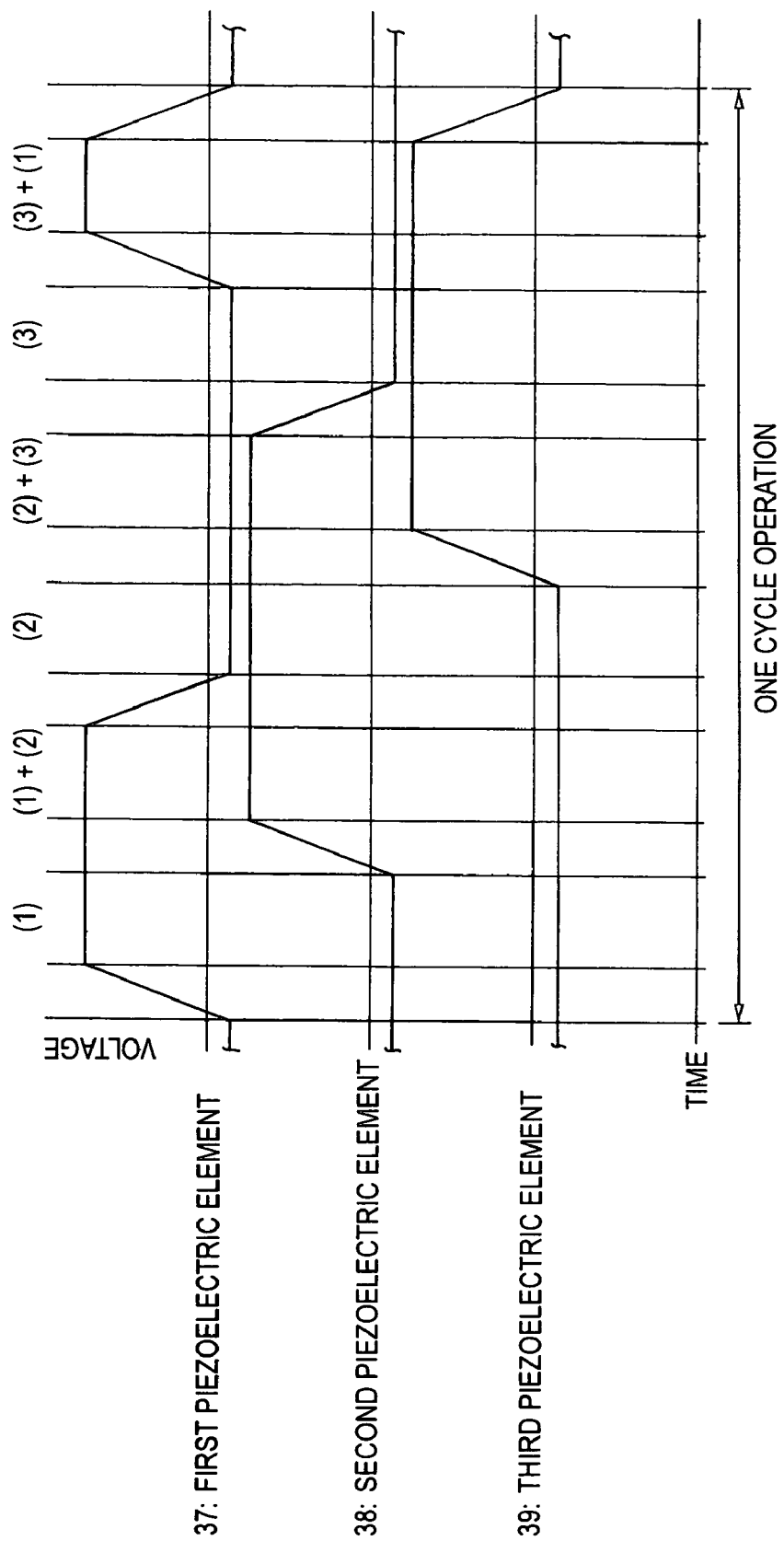
FIG. 4 is a timing chart for explaining a control of driving respective piezoelectric elements by the control circuit shown in FIG. 3.
Figure 5:
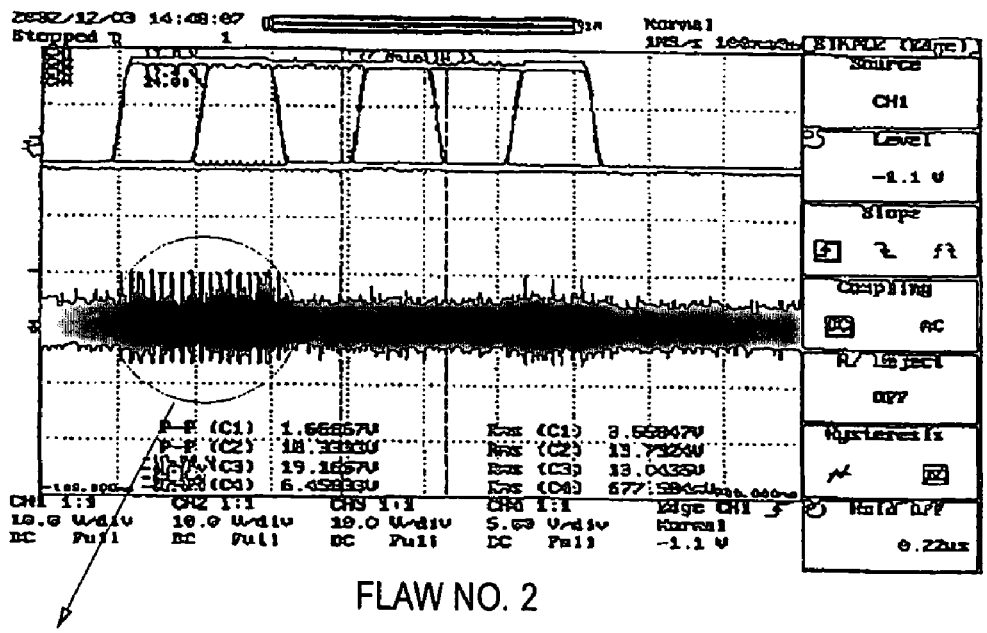
FIG. 5 is a diagram showing an example of a flaw detecting waveform detected by the bearing vibration measuring apparatus shown in FIG. 1 and particularly showing a waveform when vibration of a bearing having a flaw at a vicinity of a shoulder of an outer ring is measured.

FIG. 1 is a schematic view showing a first embodiment of a bearing vibration measuring apparatus according to the invention, FIG. 2 is a view for explaining an arrangement of a piezoelectric element used as a mechanism of driving the bearing vibration measuring apparatus shown in FIG. 1, FIG. 3 is a block diagram of a control circuit used in the bearing vibration measuring apparatus shown in FIG. 1, FIG. 4 is a timing chart for explaining a control of driving the piezoelectric element by the control circuit shown in FIG. 3, and FIG. 5 is a diagram showing an example of a waveform of detecting a flaw detected by the bearing vibration measuring apparatus shown in FIG. 1, particularly a waveform when vibration of a bearing having a flaw at a vicinity of a shoulder of an outer ring is measured.

As shown by FIG. 1, a bearing vibration measuring apparatus 10 constituting the first embodiment of the invention is an apparatus of measuring vibration of a bearing 30 and is provided with a spindle arbor 11, a bearing prepressure applying mechanism 12, a vibration detecting sensor 13, a driving mechanism 14, and a control circuit 15. Further, a one-dotted chain line A shown in FIG. 1 designates a center line passing axis cores of the spindle arbor 11, the bearing 30, the driving mechanism 14 and the bearing prepressure applying mechanism 12 in a state of applying a correct thrust load to the bearing 30 by the bearing vibration measuring apparatus 10.

The bearing 30 is a radial type rolling bearing, in more details, a radial type ball bearing having a deep groove including an inner ring 31, an outer ring 32 and a plurality of balls (that is, rolling elements) 33 arranged between the inner and the outer rings 31, 32 rotatable in a circumferential direction.

The spindle arbor 11 is connected to a rotating shaft (not illustrated) of a motor (not illustrated) and, by being supplied with an alternating current power from, for example, an inverter (not illustrated), the spindle arbor 11 is rotated at a resolution number in accordance with a frequency of the alternating current power. The spindle arbor 11 includes a first shaft portion 11a brought into contact with one end face 31a of the inner ring 31 of the bearing 30, and a second shaft portion 11b formed to project from a center portion of the first shaft portion 11a concentrically therewith and inwardly fitted to the inner ring 31 of the bearing 30.

The bearing prepressure applying mechanism 12 is arranged to be opposed to the spindle arbor 11. The bearing prepressure applying mechanism 12 is formed with a circular plate portion 12b at an end portion of a shaft portion 12a concentrically therewith. The bearing prepressure applying mechanism 12 applies a pressure load from the circular plate portion 12b to other end face 32b of the outer ring 32 of the bearing 30 via a driving mechanism 14.

The vibration detecting sensor 13 is a vibration measuring element of a piezoelectric element or the like and is fixed to a central portion of the circular plate portion 12b of the bearing prepressure applying mechanism 12. The vibration detecting sensor 13 detects a vibration component generated at the outer ring 32, the inner ring 31 and the ball 33 in the bearing 30 via the driving mechanism 14. Vibration detected by the vibration detecting sensor 13 is inputted to a sensor amplifying circuit 35 from the vibration detecting sensor 13 via a sensor cable 34.

As shown by FIG. 2, the driving mechanism 14 includes three pieces of a first, a second, and a third piezoelectric element 37, 38, and 39 in a cylindrical shape arranged on a circumference (refer to one-dotted chain line C1 or two-dotted chain line C2) at intervals of 120 degrees. The first, the second and the third piezoelectric elements 37, 38 and 39 are fixed onto the circular plate portion 12b of the bearing prepressure applying mechanism 12 by pertinent fixing means (not illustrated).

End faces of the first, the second and the third piezoelectric elements 37, 38 and 39 on one side are arranged to be brought into contact with the other end face 32b of the outer ring 32 of the bearing 30 and end faces of the first, the second and the third piezoelectric elements 37, 38 and 39 on other side are brought into contact with the circular plate portion 12b of the bearing prepressure applying mechanism 12 in measuring vibration. In this way, the first, the second and the third piezoelectric elements 37, 38 and 39 are erected on the circular plate portion 12b in parallel with the center line A.

The driving mechanism 14 can change a distance from the other end face 32b of the outer ring 32 to the circular plate portion 12b by being elongated and contracted by being provided with a drive signal from the control circuit 15. Further, as described above, FIG. 2 is a view for explaining the arrangements of the first, the second and the third piezoelectric elements 37, 38 and 39 and illustration is omitted with regard to the vibration detecting sensor 13 fixed onto the circular plate portion 12b of the bearing prepressure applying mechanism 12.

The first, the second and the third piezoelectric elements 37, 38 and 39 of the driving mechanism 14 are successively drive by the control circuit 15 with phase differences thereamong. Magnetorestrictive elements may be used in place of the first, the second and the third piezoelectric elements 37, 38 and 39, or actuators or the like elongated and contracted by an electric signal may be used.

As shown by FIG. 3, the control circuit 15 is provided with CPU (central processing unit) 40. CPU 40 transmits an instruction signal for driving the first, the second and the third piezoelectric elements 37, 38 and 39 to a piezoelectric element control circuit 41 in accordance with a previously determined processing program (further in details, processing program previously recorded in a memory, not illustrated, of ROM (Read Only Memory), RAM (Random Access Memory) or the like provided integrally with or separately from CPU 40).

The piezoelectric element control circuit 41 provides a drive signal to the first, the second and the third piezoelectric elements 37, 38 and 39 in accordance with the instruction signal inputted from CPU 40. At this occasion, the vibration signal transmitted from the vibration detecting sensor 13 is processed by a sensor amplifying circuit (sensor signal processing circuit) 35 and by inputting the processed vibration signal to CPU 40, determination of acceptability (that is, determination of acceptability with regard to presence or absence of a defect of the bearing 30) is carried out at CPU 40.

The piezoelectric element control circuit 41 includes a primary power source for supplying a power source, a DC/DC converter for generating a voltage applied to the first, the second and the third piezoelectric elements 37, 38 and 39 by being supplied with the power source of the primary power source, DAC (DA converter) for converting the piezoelectric element control signal (that is, instruction signal) from CPU 40 from a digital signal to an analog signal, a switching circuit for applying a voltage supplied from the DC/DC converter to the first, the second and the third piezoelectric elements 37, 38 and 39 as the drive signal in accordance with the analog signal outputted from the DAC and the like. Although the control circuit 15 having a simple structure can be constituted by using CPU 40, the control circuit 15 can also be constituted by a hardware by using various comparators, operational amplifiers and the like in place of CPU 40.

The control circuit 15 not only drives only any single piece of the first, the second and the third piezoelectric elements 37, 38 and 39 as shown by respective time periods (1), (2), and (3) in FIG. 4 but also simultaneously drives any two pieces of the first, the second and the third piezoelectric elements 37, 38 and 39 as shown by respective time periods (1)+(2), (2)+(3), (3)+(1). Therefore, the driving mechanism 14 can operate to incline the outer ring 32 at intervals of 60 degrees on one circumference during 1 cycle operation of measuring by the bearing vibration measuring apparatus 10 (further in details, during 1 cycle drive control by the control circuit 15).

Further, when measurement which is carried out without inclining the outer ring 32 or the inner ring 31, that is, measurement under a correct thrust load is intended to carry out, by making timings of applying the drive signal (that is, applied voltage) applied to the first, the second and the third piezoelectric elements 37, 38 and 39 and applied voltages thereof the same as each other, respective elongated and contracted amounts of the first, the second and the third piezoelectric elements 37, 38 and 39 become the same as each other and therefore, the measurement under the correct thrust load can be carried out.

When the sample bearing 30 (bearing having a defect at a vicinity of a shoulder of the outer ring) is measured by using the bearing vibration measuring apparatus 10, in driving initial two pieces of the first and the second 37 and 38, a defect pulse waveform is observed, however, in driving a remaining one piece of the third piezoelectric element 39 and when the respective piezoelectric elements 37, 38 and 39 are not driven, the defect pulse is not observed.

In this way, the bearing vibration measuring apparatus 10 can carry out the measurement in six kinds of modes of inclining the outer ring 32 (in other words, six kinds of modes of driving the piezoelectric elements in this example) as in the time periods (1), (1)+(2), (2), (2)+(3), (3), (3)+(1) in FIG. 4 and therefore, the apparatus is considerably effective in detecting that a defect of a flaw or the like is produced in the bearing 30. Further, the bearing vibration measuring apparatus 10 may be constituted to be able to select the modes of inclining the outer ring 32 in the 1 cycle operation of measurement. In relation thereto, a single one of the mode of inclining the outer ring 32 may naturally be selected in the 1 cycle operation of measurement of the bearing vibration measuring apparatus 10.

Further, the first, the second and the third piezoelectric elements 37, 38 and 39 are respectively provided with the same outer shape having the same characteristic, Further, an end face of the bearing 30 including the other end face 32b of the outer ring 32 (that is, the end face of the bearing 30 including also other end face of the inner ring 31) and a face of the circular plate portion 12b of the bearing prepressure applying mechanism 12 opposed thereto are in parallel with each other and orthogonal to the center line A in a state of applying the correct thrust load to the bearing 30 by the bearing vibration measuring apparatus 10. Therefore, a state in which the first, the second and the third piezoelectric elements 37, 38 and 39 are provided with the same length and the other end face 32b of the outer ring 32 is orthogonal to the center line A is a state under the correct thrust load and therefore, a track of the balls at this occasion constitutes a track under the correct thrust load and a track at a vicinity of a shoulder of a groove is constituted by inclining the other end face 32b of the bearing 30 from the state.

According to the bearing vibration measuring apparatus 10, the first shaft portion 11a of the spindle arbor 11 is brought into contact with the one end face 31a of the inner bearing 31 of the bearing 30 and the inner ring 31 of the bearing 30 is outwardly fitted to the second shaft portion 11b of the spindle arbor 11. Further, the circular plate portion 12b of the bearing prepressure applying mechanism 12 is arranged to be opposed to the bearing 30 while making an axis core thereof coincide with an axis core (center line A) of the spindle arbor 11 and the driving mechanism 14 is arranged such that the one end face of the driving mechanism 14 is brought into contact with the other end face 32b of the outer ring 32 of the bearing 30 and the other end face of the driving mechanism 14 is brought into contact with the circular plate portion 12b.

Under the state, the spindle arbor 11 is rotated while applying the predetermined prepressure load to the other end face 32*b* of the outer ring 32 of the bearing 30 by the bearing prepressure applying mechanism 12. By rotating the spindle arbor 11, the inner ring 31 of the bearing 30 is rotated relative to the outer ring 32.

Further, by providing the drive signal of the first, the second and the third piezoelectric elements 37, 38 and 39 by the piezoelectric element control circuit 41 in accordance with the instruction signal received from CPU 40, the driving mechanism 14 is elongated and contracted, the outer ring 32 is inclined in the previously determined direction, the vibration signal transmitted from the vibration detecting sensor 13 is processed by the sensor amplifying circuit 35 and the processed vibration signal is inputted to CPU 40 to thereby determine acceptability of the bearing 30 at GPU 40.

According to the bearing vibration measuring apparatus 10, vibration is measured while inclining the outer ring 32 by elongating and contracting the driving mechanism 14. Therefore, when the driving mechanism 14 is driven under a state of rotating the inner ring 31 and applying the prepressure load to the outer ring 32 by the bearing prepressure applying mechanism 12, the outer ring 32 is inclined by elongating and contracting the driving mechanism 14. By inclining the outer ring 32, the balls 33 arranged between the inner and outer rings 31 and 32 are rolled on two track faces of the inner and the outer rings 31 and 32 in a wider width region and therefore, a vibration measuring region can be expanded by the balls 33 rolled in the wide width region. Further, by changing a method of controlling the driving mechanism 14 which is elongated and contracted (that is, the drive mode), an arbitrary inclination can be realized and therefore, the vibration measuring region having an arbitrary pattern can be set. Thereby, a complicated mechanism is not needed and therefore, the structure becomes simple, small-sized and inexpensive, the measurement can be carried out while providing an arbitrary inclination to the outer ring 32 and the vibration measuring region can be expanded with regard to the track faces of the inner ring 31 and the outer ring 32.

(Second Embodiment)

Figure 6:
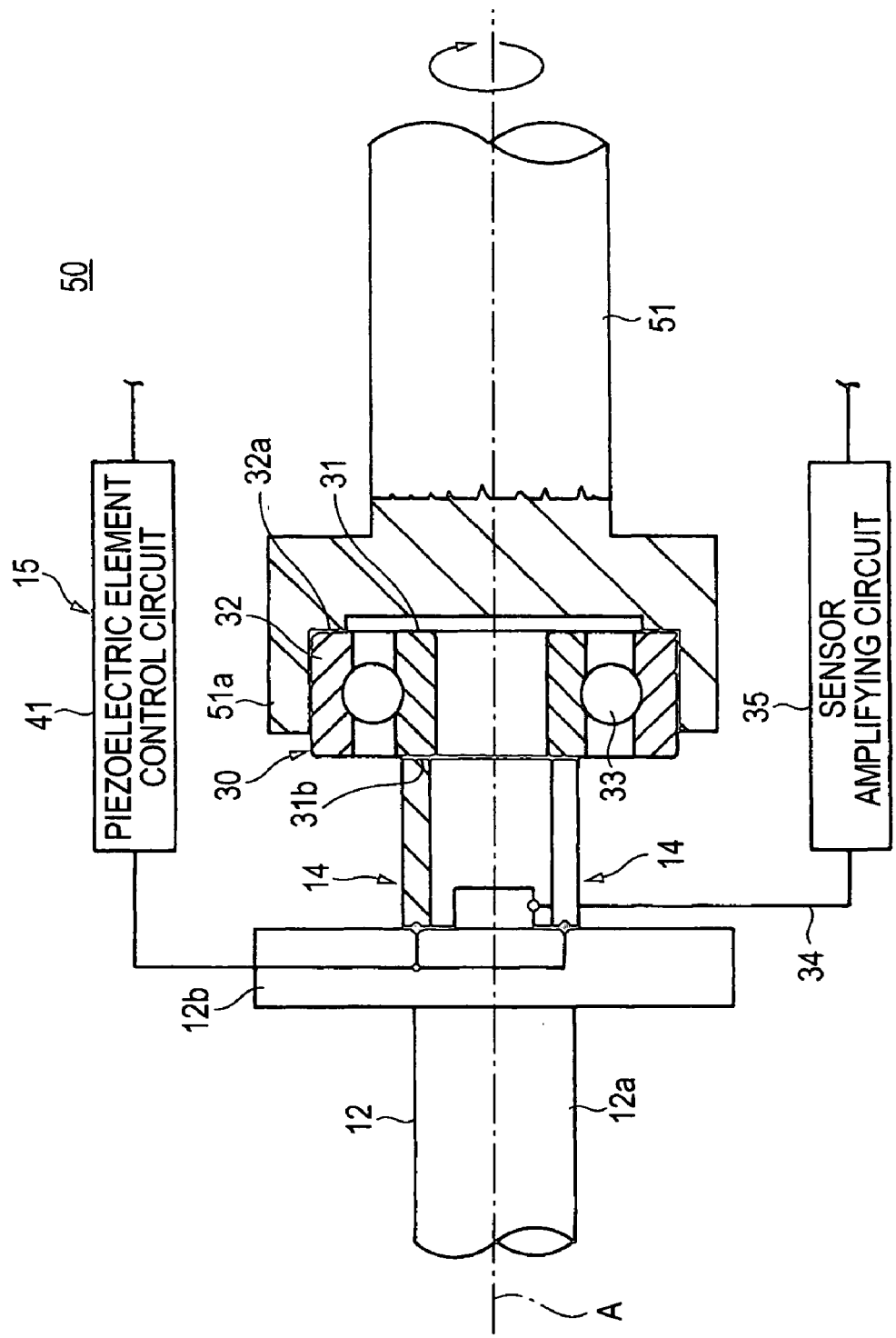
FIG. 6 is a schematic view showing a second embodiment of a bearing vibration measuring apparatus according to the invention.

FIG. 6 is a schematic view showing a second embodiment of a bearing vibration measuring apparatus according to the invention. Further, in the following explanation, an explanation will be simplified or omitted with regard to members or the like having constitution and operation similar to those of members or the like of the bearing vibration measuring apparatus 10 which has already been explained by attaching the same notations or corresponding notations in the drawings.

A bearing vibration measuring apparatus 50 constituting the second embodiment of the invention is an apparatus of measuring vibration of the bearing 30 as shown by FIG. 6 and the apparatus includes a spindle arbor 51 formed with an outer ring fitting portion 51*a* outwardly fitted to the outer ring 32 of the bearing 20 and brought into contact with one end face 32*a* of the outer ring 32 and the driving mechanism 14 including three pieces of the first, the second and the third piezoelectric elements 37, 38 and 39 arranged at intervals of 120 degrees on a circumference (refer to the one-dotted chain line C1 or the two-dotted chain line C2 as shown by FIG. 2 and arranged such that the end faces of the first, the second and the third piezoelectric elements 37, 38 and 39 on one side are brought into contact with the other end face 31*b* of the inner ring 31 of the bearing 30 and the end faces of the first, the second and the third piezoelectric elements 37, 38 and 39 on other side are brought into contact with the circular plate portion 12*b* of the bearing prepressure applying mechanism 12 (that is, erected in parallel with the centerline A on the circular plate portion 12*b*). The first, the second and the third piezoelectric elements 37, 38 and 39 are fixed onto the circular plate portion 12*b* of the bearing prepressure applying mechanism 12 by pertinent fixing means (not illustrated).

Further, although FIG. 2 is referred also in the explanation of the driving mechanism 14 of the second embodiment, a diameter of the circumference on which the first, the second and the third piezoelectric elements 37, 38 and 39 are arranged (refer to the one-dotted chain line C1 or the two-dotted chain line C2) naturally differs from that of the driving mechanism 14 according to the first embodiment (that is, smaller than that in the case of the driving mechanism 14 according to the first embodiment).

According to the bearing vibration measuring apparatus 50, when the spindle arbor 51 is rotated while applying a predetermined prepressure load to other end face 31*b* of the inner ring 31 of the bearing 30 via the driving mechanism 14, the outer ring 32 of the bearing 30 is rotated relative to the inner ring 31.

Further, the driving mechanism 14 is elongated and contracted by providing the drive signal to the first, the second and the third piezoelectric elements 37, 38 and 39 by the piezoelectric element control circuit 41 in accordance with the instruction signal received from CPU 40, the inner ring 31 is inclined in a previously determined direction, a vibration signal transmitted from the vibration detecting sensor 13 is processed by the sensor amplifying circuit 35 and the processed vibration signal is inputted to CPU 40 to thereby determine acceptability of the bearing 30 at CPU 40.

According to the bearing vibration measuring apparatus 50, vibration is measured while inclining the inner ring 31 by elongating and contracting the driving mechanism 14. Therefore, when the driving mechanism 14 is driven in a state of rotating the outer ring 32 and applying a prepressure load to the inner ring 31 by the bearing prepressure applying mechanism 12, the inner ring 31 is inclined by elongating and contracting the driving mechanism 14. By inclining the inner ring 31, the balls 33 arranged between the inner and outer rings 31 and 32 are rolled on two track faces of the inner and the outer rings 31 and 32 in a wider width region and therefore, the vibrations measuring region can be expanded by the balls 33 rolled in the wide width region. Further, by changing a method of controlling the elongated and contracted driving mechanism 14 (that is, driving mode), an arbitrary inclination can be realized and therefore, the vibration measuring region having an arbitrary pattern can be set. Thereby, a complicated mechanism is not needed and therefore, the structure is simple, small-sized and inexpensive, the measurement can be carried out while providing an arbitrary inclination to the inner ring 31 and the vibration measuring region can be expanded with regard to the track faces of the inner ring 31 and the outer ring 32.

Other operation and effect of the bearing vibration measuring apparatus 50 can be analogously predicted from the above-described explanation of the first embodiment (bearing vibration measuring apparatus 10) and therefore, an explanation thereof will be omitted.

Further, when a bearing vibration measuring method according to the first embodiment and the second embodiment is concisely described, there is provided a method of controlling to elongate and contract the driving mechanism 14 such that one of the inner ring 31 and the outer ring 32 is inclined while relatively rotating other of the inner ring 31 and the outer ring 32 in a state of pressing the one of the inner ring 31 and the outer ring 32 in an axial direction by the driving mechanism 14 which can be elongated and contracted, detecting a vibration component generated from the bearing 30 and detecting a defect of the bearing 30 based on the vibration component.

Further, when the bearing vibration measuring apparatus and the bearing vibration measuring method according to the invention are applied to inspection after fabricating a bearing, a bearing which is not provided with a defect of a flaw or the like can be selected (in other words, a bearing having a defect of a flaw or the like can be selected). Therefore, a bearing which is not provided with a defect of a flaw or the like can be provided. By using the bearing which is not provided with a defect of a flaw or the like in rotating portions in various machines or apparatus, the rotating portions can highly accurately be supported.

Figure 7A:
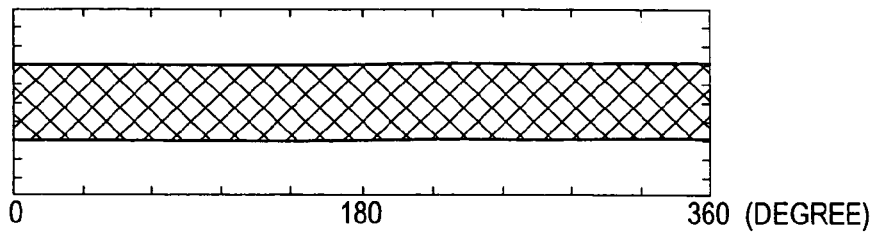
FIG. 7A shows a group of running traces of balls formed at a rolling groove of an outer ring (that is, inner circumferential face of outer ring) of a bearing by measurement by the bearing vibration measuring apparatus according to the first embodiment when measurement which is carried out without inclining the outer ring, that is, measurement under a correct thrust load is carried out.
Figure 7B:
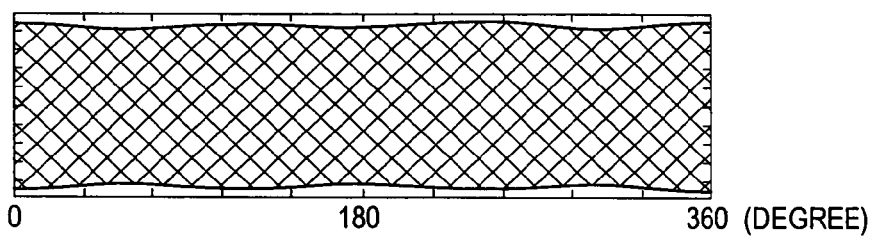
FIG. 7B shows a group of running traces of balls formed at a rolling groove of an outer ring (that is, inner circumferential face of outer ring) of a bearing by measurement by the bearing vibration measuring apparatus according to the first embodiment when measurement is carried out in six kinds of modes of inclining the outer ring (in other words, six kinds of modes of driving a piezoelectric element)

Further, FIG. 7A and FIG. 7B show groups of running traces of the balls 33 formed on a rolling groove of the outer ring 32 (that is, inner circumferential face of the outer ring 32) of the bearing 30 by measurement of the bearing vibration measuring apparatus according to the above-described first embodiment.

FIG. 7A is a development view of the rolling groove of the outer ring 32 showing the group of running traces of the balls 33 formed at the rolling groove of the outer ring 32 when measurement which is carried out without inclining the outer ring 32, that is, measurement under the correct thrust load is carried out and FIG. 7B is a development view of the rolling groove of the outer ring 32 showing the group of running traces of the balls 33 formed at the rolling groove of the outer ring 32 when measurement is carried out by six kinds of modes of inclining the outer ring 32 (in other words, six kinds of modes of driving the piezoelectric elements).

The group of running traces shown in FIG. 7B is characterized in that a width thereof in the axial direction is wider than a width in the axial direction of the groups of running traces of FIG. 7A as a whole and is provided with a wavy two side contours in the circumferential direction. A number of waves of respective, contours of the group of running traces shown in FIG. 7B is six (a ridge is counted as one and a valley is counted as one) in accordance with six kinds of inclinations of the outer ring 32. Further, a width in the axial direction of the group of running traces shown in FIG. 7A is constant and determined by the load in the axial direction, and a standard is determined for the load in the axial direction in accordance with a type number of the bearing.

The groups of running traces shown in FIG. 7A and FIG. 7B are formed similarly at the rolling groove of the inner ring 31 (that is, outer circumferential face of the inner ring 31) of the bearing 30 also by measurement of the bearing vibration measuring apparatus according to the above-described second embodiment.

When a concise description is given here of a characteristic of the bearing 30 vibration of which is measured by the bearing vibration measuring apparatus according to the first embodiment and the second embodiment while inclining one of the inner ring 31 and the outer ring 32, there is provided the bearing having the waveform in which the contours on the two sides of the group of running traces extended in the circumferential direction become remote from and proximate to each other such that the width in the axial direction of the group of running traces of the balls 33 formed over an entire periphery of one of the outer circumferential face of the inner ring 31 and the inner circumferential face of the outer ring 32 on which the balls 33 are run is increased and reduced in the circumferential direction.

Further, the invention is not limited to the above-described embodiments but can pertinently be modified or improved. Otherwise, materials, shapes, dimensions, modes, numbers, numerical values, arranging locations and the like of respective constituent elements according to the above-described embodiments are arbitrary and not limited so far as the invention can be achieved.

For example, the driving mechanism 14 is not limited to the above-described embodiments but may be constituted as indicated by modified examples shown in, for example, FIG. 8 through FIG. 11. First, a first modified example of the driving mechanism 14 will be explained in reference to FIG. 8.

(First Modified Example of Driving Mechanism 14)

Figure 8:
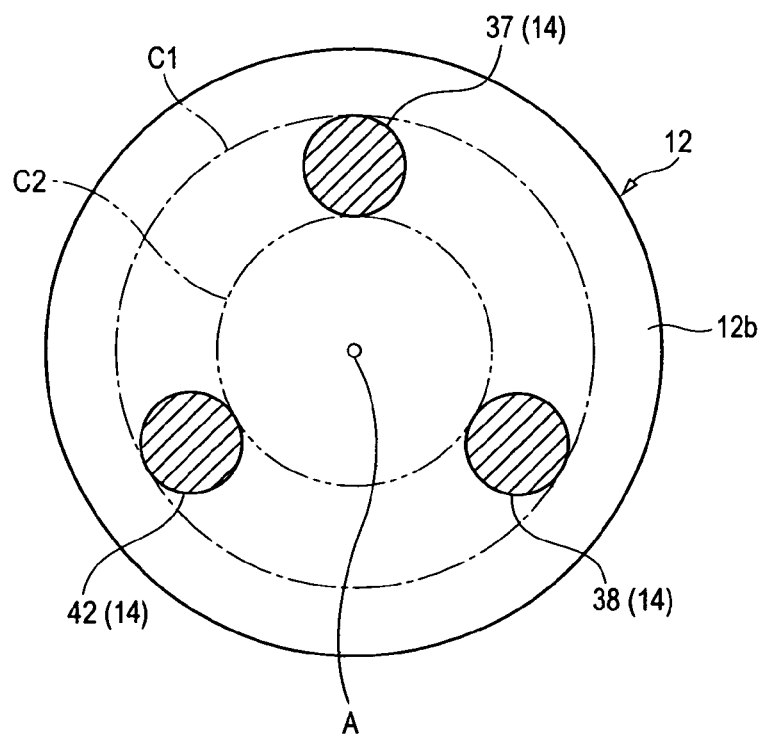
FIG. 8 is a view for explaining an arrangement of a piezoelectric element showing a first modified example of a driving mechanism.

An arrangement of the driving mechanism 14 shown in FIG. 8 is similar to the arrangement of the driving mechanism 14 shown in FIG. 2. However, the driving mechanism 14 of FIG. 8 is provided with two pieces of the first and the second piezoelectric elements 37 and 38 and one piece of a metal member (which differs from the piezoelectric element) 42 in a circular cylindrical shape in place of the third piezoelectric element 39. The first and the second piezoelectric elements 37 and 38 are driven by the control circuit 15 similar to the above-described embodiment. The first and the second piezoelectric elements 37 and 38 in a state of not being controlled to drive and the member 42 are respectively provided with the same outer dimension.

Naturally, the first and the second piezoelectric elements 37 and 38 and the metal member 42 shown in FIG. 8 are arranged such that end faces thereof on one side are brought into contact with the other end face 32b of the outer ring 32 or the other end face 31b of the inner ring 31 of the bearing 30 and end faces thereof on other side are brought into contact with the circular plate portion 12b of the bearing prepressure loading mechanism 12 and erected in parallel with the center line A on the circular plate portion 12b.

(Second Modified Example of Driving Mechanism 14)

Figure 9:
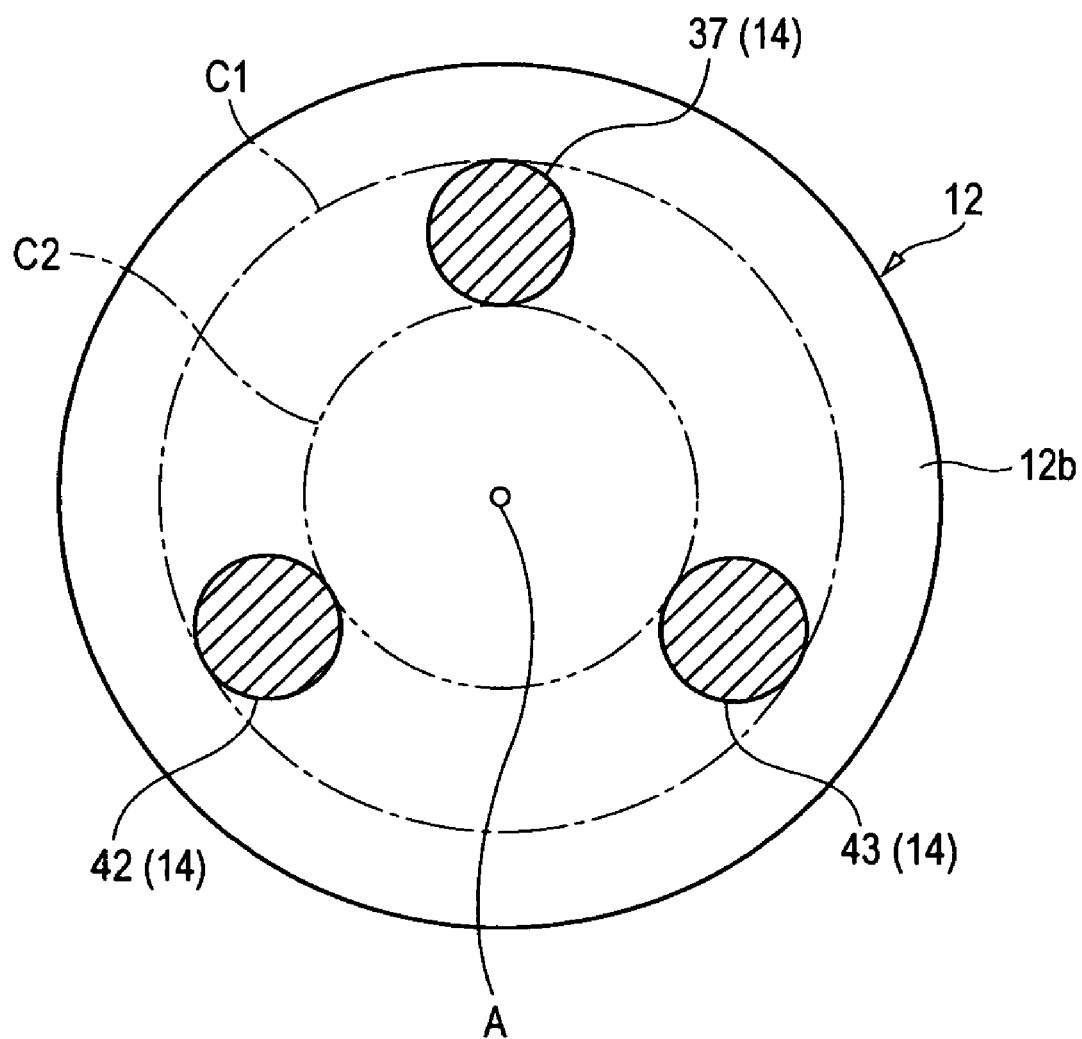
FIG. 9 is a view for explaining an arrangement of a piezoelectric element showing a second modified example of a driving mechanism.

Next, an explanation will be given of a second modified example of the driving mechanism 14 in reference to FIG. 9. Also an arrangement of the driving mechanism 14 shown in FIG. 9 is similar to the arrangement of the driving mechanism 14 shown in FIG. 2. However, the driving mechanism 14 of FIG. 9 is provided with one piece of the first piezoelectric element 37 and two pieces of metal members (which differ from the piezoelectric elements) 42 and 43 in a circular cylindrical shape in place of the second and the third piezoelectric electric elements 38 and 39. The first piezoelectric element 37 is driven by the control circuit 15 similar to the above-described embodiments. The first piezoelectric element 37 in a state of not being controlled to drive and the metal member 42 and 43 are respectively provided with the same outer dimension.

Naturally, the first piezoelectric element 37 and the metal members 42 and 43 shown in FIG. 9 are arranged such that end faces thereof on one side are brought into contact with the other end face 32b of the outer ring 32 or the other end face 31b of the inner ring 31 of the bearing 30 and end faces thereof on other side are brought into contact with the circular plate portion 42b of the bearing prepressure loading mechanism 12 and erected in parallel with the center line A on the circular plate portion 12b.

(Third Modified Example of Driving Mechanism 14)

Next, an explanation will be given of a third modified example of the driving mechanism 14 in reference to FIG. 10. An arrangement of the driving mechanism 14 shown in FIG. 10 differs from the arrangement of the driving mechanism 14 shown in FIG. 2 and four pieces of the first, the second, the third and the fourth piezoelectric elements 37, 38, 39 and 44 are arranged on a circumference (refer to the one-dotted chain line C1 or the two-dotted chain line C2) at intervals of 90 degrees. The first, the second, the third and the fourth piezoelectric elements 37, 38, 39 and 44 are driven by the control circuit 15 similar to the above-described embodiments. However, naturally, the control circuit 15 needs to be constituted to further control to drive the fourth electric element 44.

Figure 10:
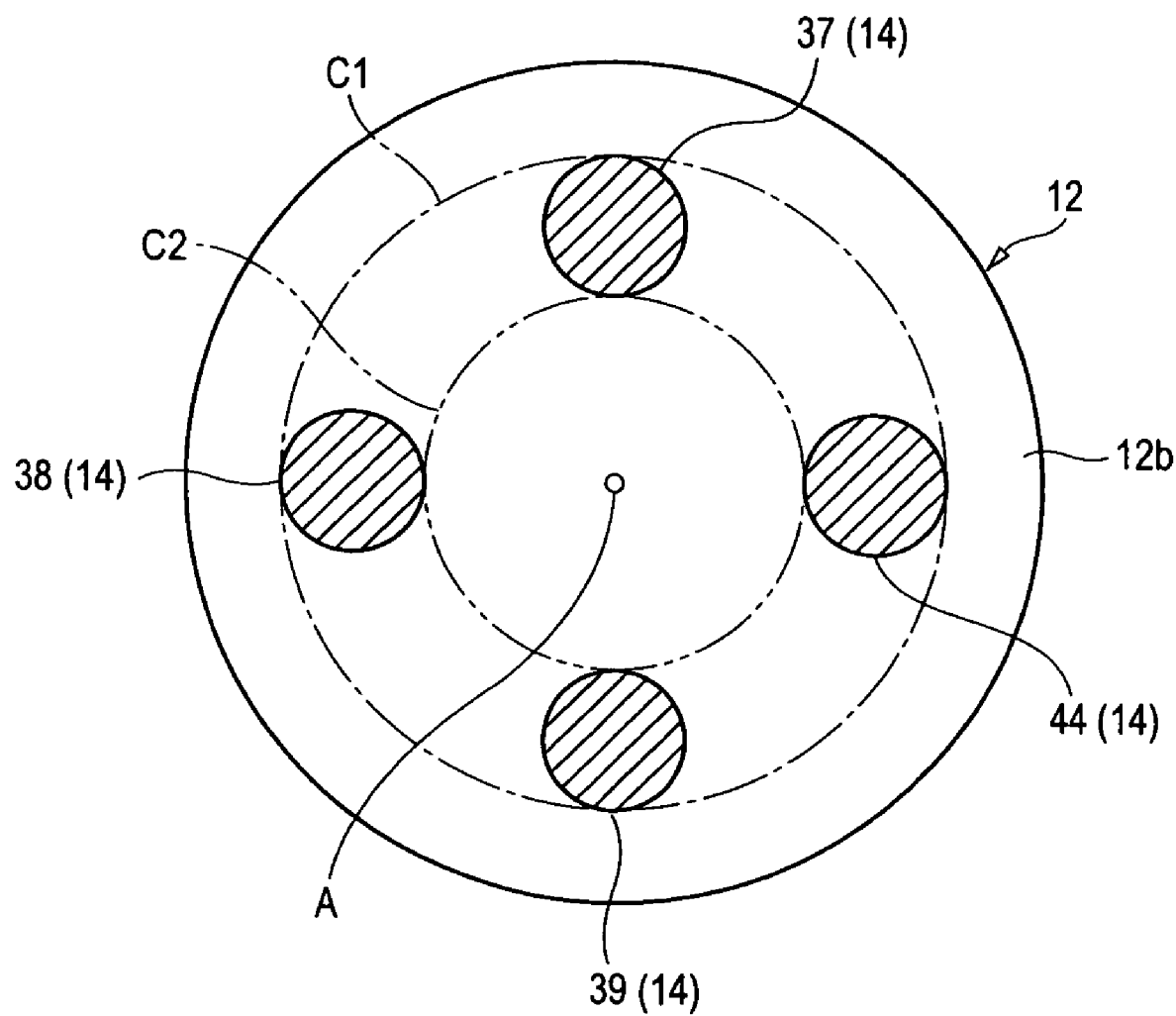
FIG. 10 is a view for explaining an arrangement of a piezoelectric element showing a third modified example of a driving mechanism.

Naturally, the first, the second, the third and the fourth piezoelectric elements 37, 38, 39 and 44 shown in FIG. 10 are arranged such that end faces thereof on one side are brought into contact with the other end face 32b of the outer ring 32 of the bearing 30 or the other end face 31b of the inner ring 31 and end faces thereof on other side are brought into contact with the circular plate portion 12b of the bearing prepressure loading mechanism 12 and erected in parallel with the center line A on the circular plate portion 12b.

Further, the first, the second, the third and the fourth piezoelectric elements 37, 38, 39 and 44 are respectively provided with the same outer dimension having the same characteristic. In the case of the third modified example of the driving mechanism 14, eight kinds of modes of inclining the inner ring 31 or the outer ring 32 are provided and therefore, the apparatus is further effective in detecting that a defect of a flaw or the like is produced at the bearing 30.

(Fourth Modified Example of Driving Mechanism 14)

Figure 11:
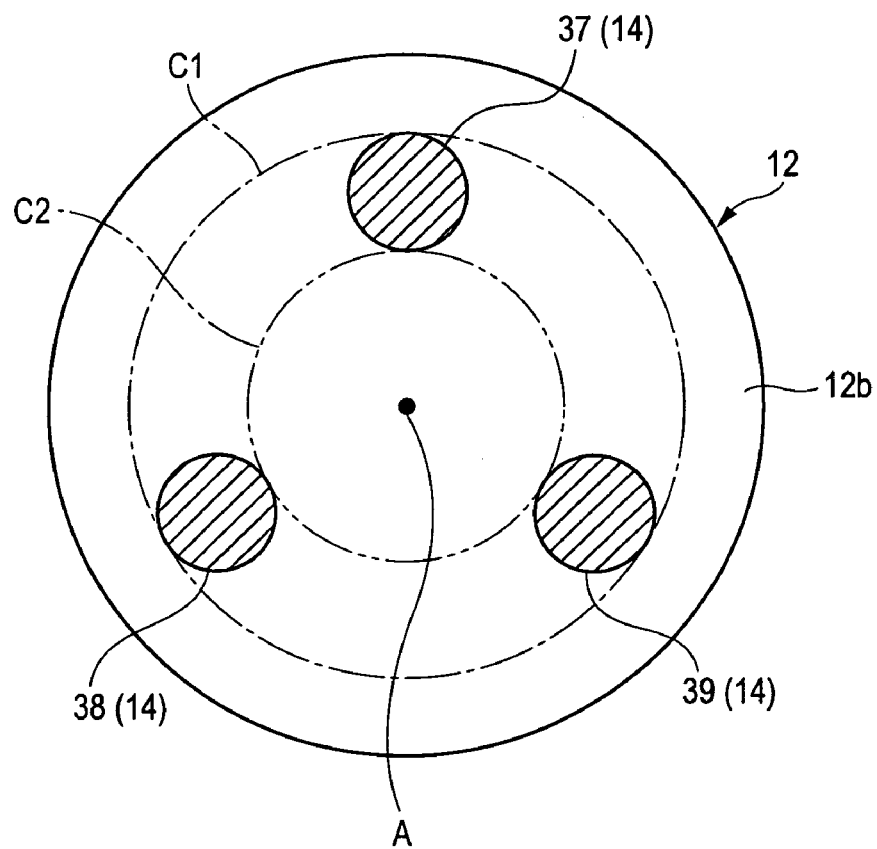
FIG. 11 is a view for explaining an arrangement of a piezoelectric element showing a fourth modified example of a driving mechanism.
Figure 12:
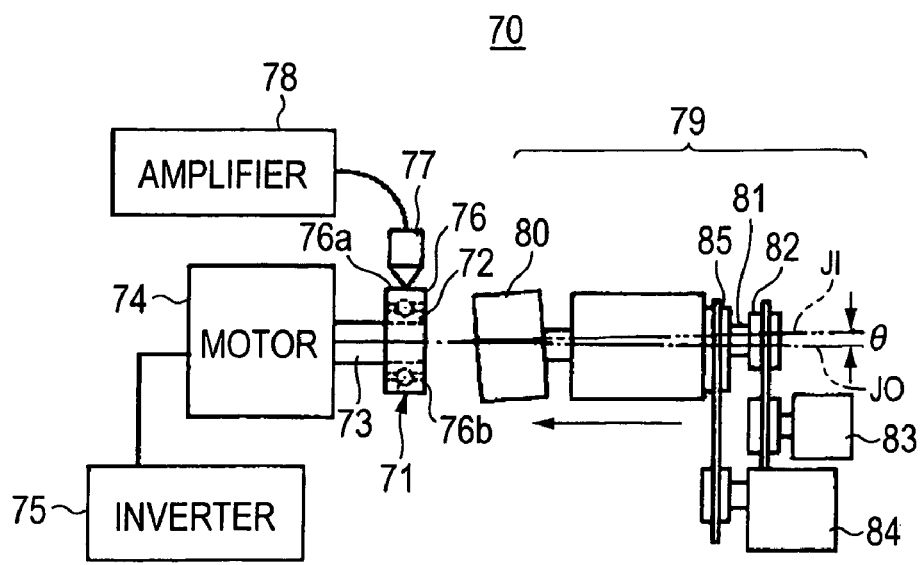
FIG. 12 is a schematic view of a bearing vibration measuring apparatus disclosed in JP-A-2002-350289.

Next, an explanation will be given of a fourth modified example of the driving mechanism 14 in reference to FIG. 11. Although the piezoelectric elements shown in FIG. 2 and FIG. 8 through FIG. 10 are arranged to equally distribute at intervals of 120° or equally distribute at intervals of 90° on a circumference, different therefrom, piezoelectric elements of the driving mechanism 14 shown in FIG. 11 are not arranged to equally distribute on a circumference. The first, the second and the third piezoelectric elements 37, 38 and 39 are driven by the control circuit 15 similar to the above-described embodiments.

Naturally, the first, the second and the third piezoelectric elements 37, 38 and 39 are arranged such that end faces thereof, on one side are brought into contact with the other end face 32b of the outer ring 32 of the bearing 30 or the outer end face 31b of the inner ring 31 and end faces thereof on other side are brought into contact with the circular plate portion 12b of the bearing prepressure loading mechanism 12 and erected in parallel with the center line A on the circular plate portion 12b.

In this way, the driving mechanism 14 may use at least one piece of the piezoelectric element. Further, the driving mechanism 14 can be supported by three points of the bearing 30 by at least three pieces of the piezoelectric elements regardless of the modes including the metal member different from the piezoelectric element as shown by FIG. 8 or FIG. 9 or the modes which are not provided with the metal member and therefore, the modes are preferable. Further, when a number of the piezoelectric elements is increased as in four pieces of the piezoelectric elements shown by FIG. 10, five pieces of the piezoelectric elements, six pieces of the piezoelectric elements . . . , selectable modes of inclining the inner ring 31 or the outer ring 32 can be increased. Further, the driving mechanism 14 may be arranged to equally distribute on the circumference as shown by FIG. 2 and FIG. 8 through FIG. 10 or arranged to not equally distribute as shown by FIG. 11.

Other operation and effect of the modified examples of the driving mechanism 14 shown in FIG. 8 through FIG. 11 can be analogously predicted from the above-described explanation of the first embodiment (bearing vibration measuring apparatus 10) and the second embodiment (bearing vibration measuring apparatus 50) and therefore, an explanation thereof will be omitted.

Further, although according to the above-described embodiments and the above-described modified example, the piezoelectric elements and the metal members respectively having, the same outer dimension are adopted as the driving mechanisms, so far as the mechanical strength can be ensured, boldnesses of the piezoelectric elements and the metal members may differ from each other. However, naturally, even when the piezoelectric elements respectively having different boldnesses are adopted, in consideration of easiness in controlling to drive the piezoelectric element and cost, it is preferable to adopt the piezoelectric elements having the same characteristic of elongation and contraction with regard to the applied drive signal.

Further, for example, the driving mechanism may not be arranged on the side of the bearing prepressure applying mechanism but may be included in the spindle arbor and also in this case, similar to the above-described embodiments, the invention can be embodied.

Further, the bearing used in the invention is not limited to the above-described ball bearing having the deep group but may be various bearings so far as the bearings are rolling bearings using balls as rolling elements such as an angular ball bearing or the like.

Further, although the second shaft portion inwardly fitted to the inner ring or the outer ring fitting portion outwardly fitted to the outer bearing formed at the spindle arbor are set in accordance with a diameter of the bearing used for the measurement, the second shaft portion inwardly fitted to the inner ring is applicable to various inner rings when a pair of ring-like members arranged with a pair of taper faces matched in a diameter direction are provided movably in the axial direction and fixed in accordance with the inner diameter of the inner ring. Further, the outer ring fitting portion outwardly fitted to the outer ring is applicable to various outer rings when an outer side plate is arranged to be able to change an inner diameter thereof in the diameter direction and fixed to the outer ring in accordance with an outer shape of the outer ring.

What is claimed is:

1. In a bearing vibration measuring apparatus for detecting a vibration component generated from a bearing, which includes an inner ring, an outer ring, and a plurality of rolling elements arranged between the inner ring and the outer ring rotatable in a circumferential direction, in a state of pressing one of the inner ring and the outer ring while relatively rotating other of the inner ring and the outer ring to measure a vibration of the bearing, and detecting a defect of the bearing based on the vibration component, the improvement comprising:
  a driving mechanism for pressing the one of the inner ring and the outer ring in an axial direction,
    wherein at least part of the driving mechanism is elongated at one period of time and contracted at another period of time for inclining the one of the inner ring and the outer ring.

2. A bearing vibration measuring method for measuring vibration of a bearing including an inner ring, an outer ring, and a plurality of rolling elements arranged between the inner ring and the outer ring rotatable in a circumferential direction, said method comprising:
  controlling to elongate or contract a driving mechanism such that one of the inner ring and the outer ring is inclined in a state of pressing the one of the inner ring and the outer ring in an axial direction by the driving mechanism while relatively rotating other of the inner ring and the outer ring;

detecting a vibration component generated from the bearing; and detecting a defect of the bearing based on the vibration component;

wherein at least part of the driving mechanism is elongated at one period of time and contracted at another period of time.

3. A radial type bearing comprising:

an inner ring;

an outer ring; and a plurality of rolling elements arranged between the inner ring and the outer ring rotatable in a circumferential direction, wherein said radial type bearing has a group of running traces of the rolling element, which is formed over an entire periphery of one of an outer circumferential face of the inner ring and an inner circumferential face of the outer ring on which the rolling element is run by a vibration measurement of a bearing vibration measuring apparatus, and contours of two sides of the group of running traces extended in the circumferential direction are waveforms which are remote from each other at a certain point and are proximate to each other at another certain point such that a width in the axial direction of the group of running traces is increased where the waveforms are remote from each other and reduced where the wave forms are proximate to each other in the circumferential direction, wherein the bearing vibration measuring apparatus detects a vibration component generated from said radial type bearing in a state of pressing one of the inner ring and the outer ring while relatively rotating other of the inner ring and the outer ring to measure a vibration of the bearing, detects a defect of the bearing based on the vibration component, and comprises:

a driving mechanism for pressing the one of the inner ring and the outer ring in an axial direction, further wherein at least part of the driving mechanism is elongated at one period of time and contracted at another period of time for inclining the one of the inner ring and the outer ring.

* * * * *